United States Patent [19]
Feather et al.

[11] 3,917,658
[45] Nov. 4, 1975

[54] 17α-(1,3'-ALKADIYNYL)-3-CYCLOALKOXY-17β-HYDROXY (OR ALKOXY) OESTRA-1,3,5(10)-TRIENES

[75] Inventors: Peter Feather, Guildford, England; Keith Emery Kendle, Aberdeen, Scotland; John Michael Telford, Cranleith, England

[73] Assignee: BDH Pharmaceuticals Limited, England

[22] Filed: May 3, 1973

[21] Appl. No.: 356,950

[30] Foreign Application Priority Data
May 3, 1972 United Kingdom............... 20546/72

[52] U.S. Cl.............................. 260/397.5; 424/243
[51] Int. Cl.² ........................................... C07J 1/00
[58] Field of Search ....... Machine Searched Steroids

[56] References Cited
UNITED STATES PATENTS

| | | | |
|---|---|---|---|
| 3,487,155 | 12/1969 | Galantay............................. | 424/238 |
| 3,592,828 | 7/1971 | Burgess et al..................... | 260/397.5 |
| 3,629,304 | 12/1971 | Baran et al. ...................... | 260/397.5 |
| 3,649,621 | 3/1972 | Stein et al.................. | 260/239.55 R |

FOREIGN PATENTS OR APPLICATIONS

| | | | |
|---|---|---|---|
| 1,074,369 | 7/1967 | United Kingdom.............. | 260/397.5 |

Primary Examiner—Elbert L. Roberts
Attorney, Agent, or Firm—Bacon & Thomas

[57] ABSTRACT

This invention is for improvements in or relating to organic compounds and has particular reference to 17α-(1',3'-alkadiynyl)-3-cycloalkoxy-17β-hydroxy (or alkoxy) oestra-1,3,5(10)-trienes and their preparation.

3 Claims, No Drawings

17<-(1;3'-ALKADIYNYL)-3-CYCLOALKOXY-17>-HYDROXY (OR ALKOXY) OESTRA-1,3,5(10)-TRIENES

Our Specification No. 1,074,369 describes and claims 17α-alka-1',3'-diynyl steroids having in the 17-position the structure

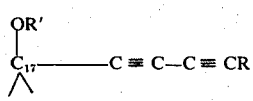

where R is an alkyl group containing not more than 5 carbon atoms and R' is H, Me, Et or tetrahydropyranyl. More specifically our British Pat. No. 1,074,369 describes and claims 17α-alka-1',3'-diynyl steroids having the formula

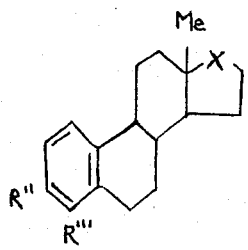

where R'' is H, OH, or OR$^{IV}$ and R''' is H or Me (where R$^{IV}$ is alkyl containing not more than 12 carbon atoms) and

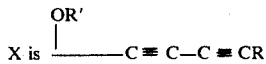

where R is an alkyl group containing not more than 5 carbon atoms, and R' is H, Me, Et or tetrahydropyranyl group.

The above Ring A aromatic compounds were found to possess in general oestrogenic, claudogenic and gonadotrophin-inhibiting properties.

We have now found that particular steroids of this class, hitherto undisclosed i.e. 17α-(1',3'-alkadiynyl)-3-cycloalkoxy steriods of the oestrane series having the general formula (I) below possess especially valuable long acting oestrogenic activity. They are thus inter alia of potential use in pest control for both male and female mammalian and avian species e.g. rats, mice, rabbits, squirrels, pigeons and starlings.

The compounds of the invention may also be used in the control of fertility in domestic animals, e.g. cats.

Moreover the compounds of the present invention may also be employed in human medicine in conventional manner in the treatment of conditions which require an oestrogen supplement for example in the treatment of menopausal or post menopausal conditions or for the suppression of lactation.

According to the present invention there are provided 17α-(1',3'-alkadiynyl)-3-cycloalkoxy steroids of the oestrane services having the general formula

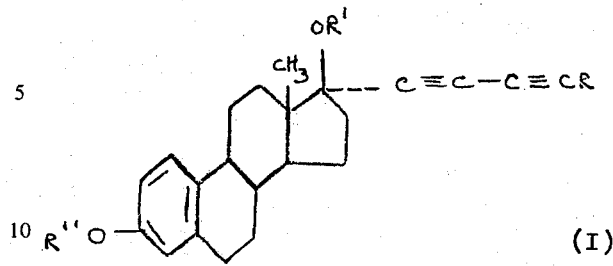

where R is an alkyl group containing not more than 3 carbon atoms and R' is H, Me or Et and R'' is a cyclopentyl or cyclohexyl group.

A preferred group of compounds is that wherein R'' is a cyclopentyl group, R' is H or Me, in particular 3-cyclopentyloxy-17α-(1',3'-hexadiynyl)-oestra-1,3,5(10)-trien-17β-ol.

The new compounds of this invention may be prepared according to the process described in our British Pat. No. 1,074,369 which process comprises alkylating under anhydrous conditions a metal derivative of the corresponding 17α-butadiynyl steroid having in the 17-position the structure

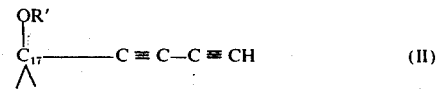

where R' is H, Me, Et or tetrahydropyranyl.

17α-Butadiynyl-3-cycloalkoxy-1,3,5(10)-oestratrien-17β-ols may be converted into compounds according to the invention by reaction of an alkali metal derivative thereof e.g. lithium, with an appropriate alkyl halide, e.g. bromide or iodide in an anhydrous medium, preferably a mixture of liquid ammonia and a nonhydroxylic organic solvent, e.g. ether or tetrahydrofuran. The reaction mixture may be stirred for up to 24 hours at a temperature between −70°C. and the reflux temperature of the mixture.

The alkali metal derivative, may be prepared in situ by adding a solution of the steroid, in anhydrous tetrahydrofuran to the amide of the alkali metal in liquid ammonia.

Alternatively, after protecting the 17β-hydroxy group by conventional methods for example, by tetrahydropyranyl ether formation, sodamide may be used in place of lithamide and the 17β-hydroxy group subsequently regenerated.

17α-Butadiynyl-3-cycloalkoxy-1,3,5(10)-oesratrien-17β-ols may be converted into the corresponding 17α-alkadiynyl-17β-methyl and ethyl ethers by treating directly with sodamide and the appropriate alkyl iodide in liquid ammonia and a suitable organic solvent such as tetrahydrofuran.

The new compounds of this invention may also be prepared by the process claimed in our British Pat. No. 1,081,494 which process comprises reacting the corresponding 17-oxo-steroid with a metallic derivative of an alka-1,3-diyne consisting of the lithium, sodium, potassium or magnesium (mono-Grignard) derivative and subsequently regenerating the desired 17β-hydroxy steriod from the complex so formed.

Monosodio alkyl-1,3-diynes are the preferred reagents and may be conveniently prepared by treating the appropriate alkadiyne with for example, sodamide in liquid ammonia.

The 17-oxo steroid starting material may be added in an anhydrous non-hydroxylic organic solvent such as ether or tetrahydrofuran to the prepared solution of the metal alkadiyne derivative. After addition is complete, the mixture may be stirred under reflux for example, for one or more hours.

Alternatively, the corresponding 3-alcohol of compounds of formula (I) may be etherified for example, by treatment with an appropriate bromocycloalkane, e.g. bromocyclopentane or hexane. The reaction is preferably carried out in a solution of an alkali metal alkoxide e.g. sodium ethoxide, in an alcohol e.g. ethanol, in an inert atmosphere. The reaction is preferably carried out under reflux.

The conversion of 17α-(1′,3′-alkadiynyl)-1,3,5(10)-oestratriene-3,17β-diols into their 3-cycloalkyl ethers may be achieved by other known procedures for conversion of phenols into alkylaryl ethers. Such procedures are reviewed, for example, in Houben-Weyl, Methoden der Organischen Chemie, 4th Edition, Volume VI, Part 3, pages 49–85 (1965).

Our British Pat. No. 1,108,758 claims a process for the preparation of substituted 17α-buta-1′,3′-diynyl-17β-hydroxy-(17β-alkoxy)-steroids having in the 17-position the structure

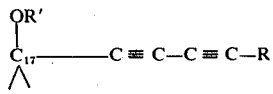

where R′ is H or an alkyl group containing not more than 5 carbon atoms, and R is an alkyl, hydroxyalkyl or alkenyl group containing not more than 5 carbon atoms, or an alkynyl group containing not more than 7 carbon atoms, or an aryl group containing not more than 9 carbon atoms, which process comprises treating an ethynyl compound R″—C ≡ CH with a cuprous salt and a bromoethynyl compound R‴—C ≡ CBr wherein one of R″ and R‴ represents a steroidal moiety with the ethynyl or bromoethynyl group attached at $C_{17}$ (to which there is also attached a β–OR′ group) and the other of R″ and R‴ represents an alkyl, hydroxyalkyl or alkenyl group containing not more than 5 carbon atoms, or an alkynyl group containing not more than 7 carbon atoms, or an aryl group containing not more than 9 carbon atoms.

The new compounds according to the invention may also be prepared by the method described in our British Pat. No. 1,108,758. Thus the 3-cycloalkoxy-17α-alka-1′,3′-diynyloestra-1,3,5(10)-trien-17β-ols of formula (I) may be prepared by treating an ethynyl compound $R^{II}$—C ≡ CH with a cuprous salt and a bromoethynyl compound $R^{III}$ C ≡ CBr where one of $R^{II}$ and $R^{III}$ represents the steroidal moiety with the ethynyl or bromo ethynyl group attached at $C_{17}$ (to which there is also attached a β-OR′ group) and the other of $R^{II}$ and $R^{III}$ represents an alkyl group containing not more than 3 carbon atoms.

The cuprous salt is preferably cuprous chloride. The reaction is conveniently carried out in the presence of a base such as ethylamine and of a reducing agent preferably hydroxylamine to maintain the copper in the cuprous state. The reaction may be carried out in an inert atmosphere at temperatures between −10°C. and 40°C. or higher or advantageously at 0°C. or room temperature. An organic solvent is also preferably present, in which the cuprous salt of the ethynyl compound is adequately soluble. Polar solvents especially mixtures consisting of an alcohol and dimethyl formamide containing some water are preferred. When the reaction is complete a reagent for example, potassium cyanide may be added to destroy any residual acetylenic cuprous compound.

By published methods for alkylation of tertiary hydroxy groups, 17β-hydroxy steroids according to the invention may, for example by treatment with sodamide and an alkyl iodide in liquid ammonia and tetrahydrofuran, be converted into their corresponding 17β-methyl and ethyl ethers. Thus the following compounds may be prepared by the above described processes.

3-cyclopentyloxy-17β-hydroxy-17α-(1′,3′-pentadiynyl)-1,3,5(10)-oestratriene, 3-cyclopentyloxy-17α-(1′,3′-hexadiynyl)-17β-hydroxy-1,3,5(10)-oestratriene, 3-cyclopentyloxy-17α-(1′,3′-heptadiynyl)-17β-hydroxy-1,3,5(10)-oestratriene, and the corresponding 17β-methoxy and ethoxy compounds.

The invention also provides pharmaceutical preparations comprising a 17α-(1′,3′-alkadiynyl)-3-cycloalkoxy steroid of the oestrane series having the general formula (I) above where R, R′ and R″ have the same meaning as in formula (I) in admixture with one or more solid or liquid inert pharmaceutical carriers or excipients.

The term pharmaceutical is used herein to refer to both human and veterinary medicine.

When used in pest control the 3-cycloalkoxy steroids of the present invention may be incorporated with a suitable bait. The bait may comprise one or more of the following: cereals e.g. maize, oats, rice, rye, wheat and barley, fish meals, vegetable oils e.g. maize oil, arachis oil, cotton grain oil, sugar, meat, nuts, mash or commercially available baits e.g. Hormoform or other known edible materials. The bait may also include a filler or carrier such as starch, montmorillonite clay, attapulgite clay, diatomaceous earth, powders of natural rocks, e.g. kaolin, chalk talc or synthetic rocks, e.g. finely dispersed silica or silicates.

The particular bait will be dependent upon the species to be treated and the area to be controlled.

The steroidal active ingredient may be incorporated in a final bait composition by methods known to those skilled in the art.

The active steroidal compound of the present invention may be ground to a finely powdered form and mixed with a suitable filler such as flour or lactose. The principal bait ingredient may be added and the whole mixture bound together with a suitable oil. The resulting bait may be compressed into pellets or surrounded in a paraffin wax block.

Mould inhibitors are useful additives to oat baits especially when they are to be used under wet conditions e.g. sewers. The most satisfactory compounds for this purpose are p-nitrophenol and dehydroacetic acid.

In tropical climates the incorporation of insecticides e.g. DDT into baits is advantageous to avoid infestation of the baits by insect pests.

It may be desirable or necessary to add colouring to the bait. Suitable dyes include prussian blue and methylene blue.

For pest control the active compounds of this invention are incorporated in the bait formulation to make a final dosage composition of between 0.00015% w/w and 1.5% w/w preferably 0.0015%–0.15% w/w conveniently 0.0075%–0.075% w/w of active component.

The range of 0.0075%–0.075% w/w is preferred for rats. The effect of the compound on a single administration to rats lasts for a period of days to in excess of six months depending on the concentration of the compound in the bait. By single administration we mean that the bait is left at the site to be treated e.g. refuse tip, for sufficient time to enable all the rats to take the bait.

For the control of avian species e.g. pigeons a dosage composition of more than 0.125% w/w of active ingredient is preferable and more preferably at least 0.4% w/w. Thus a bait containing 0.4% to 0.8% w/w of active ingredient suppresses egg laying for up to six months.

The bait for mammalian species e.g. rats may conveniently consist mainly of pinhead oatmeal (90% w/w) with wholemeal flour (5% w/w) and corn oil (5% w/w). This may be administered as a pre-bait and then as the bait containing the active ingredient.

For the control of fertility in domestic animals the compounds of the invention are administered at a dose of between 0.1 and 100 mg. per kilogram of the animal treated, preferably 1–50 mg/kg. and a dose of 5–25 mg/kg. may conveniently be employed for cats. For use in connection with domestic animals the compounds are conveniently administered at three to six monthly intervals in tablet form or by injection.

For use in human medicine a suitable dosage unit would be 10 $\mu$g to 1 mg. daily or a single dosage unit of 1 to 50 mg., preferably administered in tablet or capsule form.

Pharmaceutical preparations according to the present invention may be rendered more attractive by the addition of flavourings, either natural or artificial.

Following is a description by way of example of methods of carrying the invention into effect.

EXAMPLE I

3-Cyclopentyloxy-17$\alpha$-(1',3'-hexadiynyl)-1,3,5(10)-oestratrien-17$\beta$-ol 1,3-Hexadiyne (10.4 g.) in anhydrous tetrahydrofuran (25 ml.) was added dropwise to a stirred suspension of sodamide (from 2.66 g. of sodium and a trace of ferric nitrate) in liquid ammonia (450 ml.) and the mixture was stirred under reflux for 30 minutes. Oestrone 3-cyclopentyl ether (13.2 g.) in anhydrous tetrahydrofuran (575 ml.) was added slowly and the mixture was stirred under reflux for 5 hours. Ammonium chloride (7.0 g.) was added and the ammonia allowed to evaporate. The steroidal product was extracted with ether and the ether evaporated at reduced pressure. Purification by chromatography on alumina, eluting with toluene, and by crystallisation from ether/hexane gave 3-cyclopentyloxy-17$\alpha$-(1',3'-hexadiynyl)-1,3,5(10)-oestratrien-17$\beta$-ol, m.p. 153°C., $[\alpha]_D^{25}$ − 43° (c, 1% in dioxan); $\lambda_{max}$. 289nm ($\epsilon$, 1795), 280 nm ($\epsilon$, 1975), 224 nm ($\epsilon$, 9248); $\lambda_{inf}$ 259 nm ($\epsilon$, 585); $\nu_{max}^{CH_2Cl_2}$ 3585 cm$^{-1}$.

EXAMPLE II

3-Cyclopentyloxy-17$\alpha$-(1',3'-hexadiynyl)-1,3,5(10)-oestratrien-17$\beta$-ol 17$\alpha$-(1',3'-Hexadiynyl)-1,3,5(10)-oestratriene-3,17$\beta$-diol (Example 18 of British Pat. No. 1,081,494) (65.0 g.) was dissolved in a solution of sodium ethoxide (from 20.5 g. of sodium) in absolute ethanol (1020 ml.) under an atmosphere of nitrogen. Bromocyclopentane (150 ml.) was added and the mixture refluxed for 3 hours. More bromocyclopentane (25 ml.) was added and refluxing continued for 2 hours. The mixture was concentrated to 250 ml., poured into water (3 liters) and the steroidal product extracted with ether. The ethereal solution was dried over sodium sulphate, treated with charcoal and the ether evaporated at reduced pressure. Acetone (250 ml.) was added and evaporated at reduced pressure. Trituration with petroleum (boiling range 60°–80°C.) containing a little ether gave a solid which was recrystallized froml ether/methanol, giving 3-cyclopentyloxy-17$\alpha$-(1',3'-hexadiynyl)-1,3,5(10)-oestratrien-17$\beta$-ol, as colourless needles, identical with the previous product.

EXAMPLE III

3-Cyclopentyloxy-17$\alpha$-(1',3'-hexadiynyl)-1,3,5(10)-oestratrien-17$\beta$-ol 1,4-Dichlorobutyne (16.4 g.) was added dropwise to a stirred suspension of sodamide (from 9.2 g. of sodium and a trace of ferric nitrate) in liquid ammonia (350 ml.) and the mixture was stirred under reflux for 20 minutes. Ethyl iodide (20.8 g.) was added slowly and stirring was maintained for a further 2 hours.

A suspension of sodamide (from 3.2 g. of sodium and a trace of ferric nitrate) in liquid ammonia (120 ml.) was prepared and added to the reaction mixture followed, after 30 minutes, by a solution of oestrone 3-cyclopentyl ether (22.4 g.) in dry tetrahydrofuran (200 ml.). Stirring under reflux was continued for a further 3 hours, ammonium chloride (16 g.) was added, and the ammonia was allowed to evaporate overnight. Water (1000 ml.) was added to the residue and the steroidal product was extracted into ether. Evaporation of the water-washed and dried (sodium sulphate) extract left a gummy solid which was crystallised from methanol to give 3-cyclopentyloxy-17$\alpha$-(1',3'-hexadiynyl)-1,3,5(10)-oestratrien-17$\beta$-ol (18.3 g.), m.p. 152° to 154°C., identical with that obtained in Example I.

Formulation Examples For Rodents

| Example A | | |
|---|---|---|
| Pinhead oatmeal | 90% | |
| Wholemeal flour | 5% | 99.985% |
| Corn Oil | 5% | |
| 3-Cyclopentyloxy-17$\alpha$-hexa-1',3'-diynyl-oestra-1,3,5(10)-trien-17$\beta$-ol | | 0.015% |
| Example B | | |
| Pinhead oatmeal | 90% | |
| Wholemeal flour | 5% | 99.85% |
| Corn Oil | 5% | |
| 3-Cyclopentyloxy-17$\alpha$-hexa-1',3'-diynyl-oestra-1,3,5(10)-trien-17$\beta$-ol | | 0.15% |
| Example C | | |
| Pinhead oatmeal | 90% | |
| Wholemeal flour | 5% | 99.95% |
| Corn Oil | 5% | |
| 3-Cyclopentyloxy-17$\alpha$-hexa-1',3'-diynyl-oestra-1,3,5(10)-trien-17$\beta$-ol | | 0.05% |
| Example D | | |
| Pinhead oatmeal | 85% | |
| Wholemeal flour | 5% | 99.95% |
| Lactose | 5% | |

-continued
Formulation Examples For Rodents

| | | |
|---|---|---|
| Corn Oil | 5% | |
| 3-Cyclopentyloxy-17α-hexa-1',3'-diynyl-oestra-1,3,5(10)-trien-17β-ol | | 0.05% |

In the above examples the steroid is reduced to a fine powder in a glass mortar and mixed with the wholemeal flour and lactose if present. When a uniform dispersion is obtained, this is added to the pin head oatmeal in a suitable mixing vessel, the corn oil added, and the bait mixed by hand until it appears homogeneous, i.e. the pin head oatmeal particles have a uniform coating of oil which binds the flour containing the steroid to their surface.

A bait containing the formulation of Example D was left at a refuse tip for 6 days markedly reducing the rat population (*Rattus norvegicus*) and this effect lasted in excess of six months. A further application of the bait may be given if necessary.

For Pigeons

| | | |
|---|---|---|
| Example E | | |
| "Hormoform" | 99.875% | |
| 3-Cyclopentyloxy-17α-hexa-1',3'-diynyl-oestra-1,3,5(10)-trien-17β-ol | | 0.125% |

In Example E the steroid is reduced to a fine powder in a glass mortar and mixed with a suitable quantity of lactose. The powder is added to the "Hormoform". Mechanical and manual mixing then produces a homogeneous dispersion of the powder over the slightly oily surface of the granular diet.

A similar bait may be prepared containing 0.4% of active ingredient.

We claim:
1. 17α-(1',3'-alkadiynyl)-3-cycloalkoxy steroids of the oestrane series having the general formula

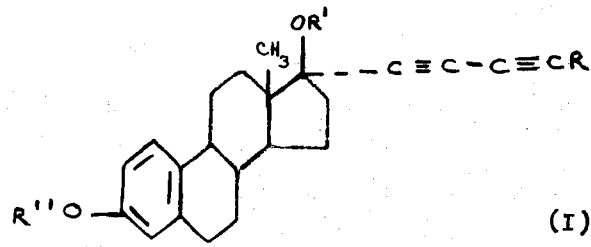

(I)

where R is an alkyl group containing not more than 3 carbon atoms and R' is H, Me or Et and R" is a cyclopentyl or cyclohexyl group.

2. 17α-(1',3'-alkadiynyl)-3-cycloalkoxy steroids according to claim 1 wherein R' is H or Me and R" is a cyclopentyl group.

3. 3-Cyclopentyloxy-17α-(1',3'-hexadiynyl)-oestra-1,3,5(10)-trien-17β-ol.

* * * * *